US008556320B2

(12) United States Patent
Yamagishi et al.

(10) Patent No.: US 8,556,320 B2
(45) Date of Patent: Oct. 15, 2013

(54) CONSOLE BOX

(75) Inventors: Kyosuke Yamagishi, Wako (JP);
Masamitsu Shiono, Wako (JP);
Kazunari Nishio, Kiyosu (JP); Yasuhiro Kodama, Kiyosu (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/599,525

(22) Filed: Aug. 30, 2012

(65) Prior Publication Data
US 2013/0057011 A1 Mar. 7, 2013

(30) Foreign Application Priority Data

Sep. 7, 2011 (JP) ................................. 2011-195382

(51) Int. Cl.
*B60R 7/04* (2006.01)
(52) U.S. Cl.
USPC ....................................... 296/24.34; 296/37.8
(58) Field of Classification Search
USPC .............. 296/24.34, 37.8, 37.12, 1.09, 37.15;
312/328; 297/115, 411.21, 411.32,
297/411.33, 411.34, 188.14, 188.15,
297/188.16, 188.19
See application file for complete search history.

(56) References Cited

U.S. PATENT DOCUMENTS 1,987,448 A * 1/1935 Pearson ........................ 312/266

FOREIGN PATENT DOCUMENTS

| JP | 10-016649 | | 1/1998 |
| JP | 2009083817 A | * | 4/2009 |
| JP | 2010137798 A | * | 6/2010 |

* cited by examiner

*Primary Examiner* — Jason S Morrow
(74) *Attorney, Agent, or Firm* — Rankin, Hill & Clark LLP

(57) ABSTRACT

A console box placed in a vehicle passenger compartment includes a console body for storing articles, a lid located on a top surface of the body, and a storage portion formed on a back surface of the lid for storing a small item. The storage portion is opened in response to opening of the lid, and is closed in response to closing of the lid. The lid has one end attached to the body through support shafts such that the lid pivots between open and closed positions. The storage portion has one end attached to the lid through support shafts such that the storage portion pivots between open and closed positions. The lid has a free end opposite the one end thereof and the storage portion has a free end opposite the one end thereof. The free ends face in the same direction.

11 Claims, 14 Drawing Sheets (COMPARATIVE EXAMPLE 1)

(COMPARATIVE EXAMPLE 1)

(COMPARATIVE EXAMPLE 2)

(EMBODIMENT)

CONSOLE BOX

FIELD OF THE INVENTION

The present invention relates to a console box placed in a vehicular compartment and the console box includes a console body and a lid portion disposed on a top surface of the console body.

BACKGROUND OF THE INVENTION

A console box disposed on a side of a driver's seat is well-known in the art, as disclosed in JP-A-10-16649. The console box disclosed in JP-A-10-16649 includes a console body defining a first storage compartment, a case disposed above the first storage compartment and defining a second storage compartment, and a lid pivotably supported by the console body. The lid is provided with a hook member releasably engageable with a front end of the case. When the lid is opened with the hook member engaged with the front end of the case, the first storage compartment is opened. When the lid is opened with the hook member disengaged from the front end of the case, the second storage compartment is opened.

When the lid is opened with the hook member disengaged from the front end of the case, more specifically, the case moves to an inclined position in which the second storage compartment is opened forward to allow an item to be stored in or taken out of the second storage compartment.

As for the console box disclosed in JP-A-16649, the lid itself defines no space for storing an item. It is thus preferable that the lid itself be more advantageously used. Further, the console box may be clumsy because the hook member needs to be disengaged from the front end of the case in order to use the second compartment.

It is an object of the present invention is to provide an easy-to-use console box having a more advantageous lid.

SUMMARY OF THE INVENTION

According to one aspect of the present invention, there is provided a console box placed in a passenger compartment of a vehicle, the console box comprising: a console body for storing a first article; a lid portion located on a top surface of the console body and movable between an open position and a closed position; and a storage portion formed on a back surface of the lid portion for storing a second article, wherein the storage portion moves to an open position in response to movement of the lid portion to the open position, and moves to a closed position in response to movement of the lid portion to the closed position.

The back surface of the lid portion is effectively used to provide the storage portion. The storage portion moves to the open position in response to the movement of the lid portion to the open position and moves to the closed position in response to the movement of the lid portion to the closed position. That is, the movement of the lid portion between the open position and the closed position moves the storage portion between the open position and the closed position. In storing the second article in the storage portion or removing the second article from the storage portion, thus, an operation of opening the storage portion is not required. An operation of closing the storage portion after opening the storage portion is not required, either. The console box, which requires neither the operation of opening the storage portion nor the operation of closing the storage portion, is easy to use.

Preferably, the lid portion includes one end and a support shaft, the one end of the lid portion being attached to the console body through the support shaft of the lid portion in such a manner as to allow the lid portion to pivot between the open position and the closed position. The storage portion includes one end and a support shaft, the one end of the storage portion being attached to the lid portion through the support shaft of the storage portion in such a manner as to allow the storage portion to pivot between the open position and the closed position. The lid portion includes a free end opposite the one end of the lid portion and the storage portion includes a free end opposite the one end of the storage portion, the free end of the lid portion and the free end of the storage portion facing in the same direction.

Since the free end of the storage portion and the free end of the lid portion face in the same direction, the first article and the second article can be carried in the same direction for storage in the console body and the storage portion, respectively. For example, the movement of the lid portion to the open position allows easy placement of a second article such as a sunglass into the storage portion. Namely, first and second articles can be easily stored in or taken out of the console body and the storage portion, respectively.

Preferably, the free end of the storage portion moves away from the free end of the lid portion during pivotal movement of the lid portion to the open position.

The movement of the free end of the storage portion away from the free end of the lid portion during the movement of the lid portion to the open position provides a large opening between the free ends of the storage portion and the lid portion, such that the second article can be stored in or taken out of the storage portion.

Preferably, the console box further comprises an urging member disposed between the lid portion and the storage portion and urging the storage portion in such a direction as to allow the storage portion to move to the open position.

The provision of the urging member allows the storage portion to move to the open position without aid of gravity in response to the movement of the lid portion to the open position.

Preferably, the storage portion includes a lateral side surface and a projection projecting from the lateral side surface, the projection abutting on the console body when the lid portion moves to the closed position.

When the lid portion moves to the open position, the projection comes out of abutment on the console body as the storage portion moves to the open position. When the lid portion moves to the closed position, the projection comes into abutment on the console body and the storage portion moves to the closed position. The movement of the lid portion makes it possible to store a second article such as a sunglass in the storage portion or take the second article out of the storage portion without opening or closing the storage portion.

Preferably, the storage portion defines an opening proximate the support shaft of the storage portion such that a third article smaller in size than the second article is removed from the opening.

The opening discharges the third article (such as a coin or a pin) which has been inadvertently dropped into the storage portion. This opening increases utility of the storage portion.

Preferably, the lid portion includes a shield wall disposed on the back surface of the lid portion, the shield wall being located proximate the free end of the storage portion with the lid portion in the closed position so as to prevent the second article from coming out of the storage portion.

With the lid portion in the closed position, a clearance between the free end of the storage portion and the shield wall located proximate the free end of the storage portion may be so small that the second article cannot pass through the clearance. This makes it possible to prevent the second article from coming out of the storage portion toward the console body.

Preferably, the lid portion includes a guide hole for guiding the projection.

Provision of the guide hole allows the projection to move smoothly relative to the lid position.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
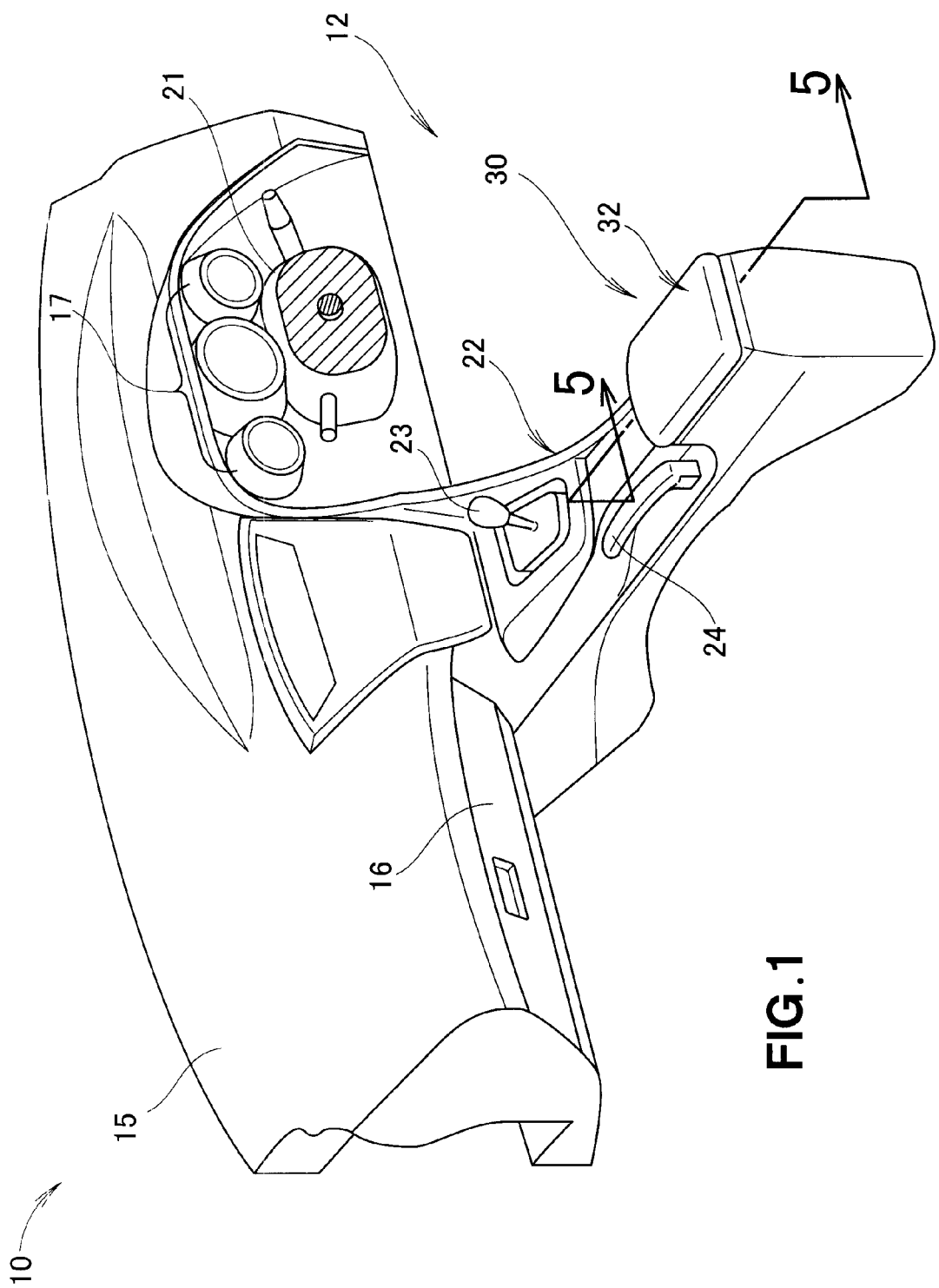
FIG. 1 is a perspective view of a passenger compartment accommodating a console box in a first embodiment of the present invention.

As shown in FIG. 1, a vehicle 10 defines a passenger compartment 12. The passenger compartment accommodates a laterally extending instrument panel 15, a glove box 16 defined by a lower part of the instrument panel 15, a set of meters 17 disposed on a front face of the instrument panel 15, a steering column 21 disposed below the meters 17, a center console 22 extending rearward from a center of the instrument panel 15, a shift lever 23 projecting from a front part of the center console 22, a brake lever 24 disposed on a middle of the center console 22, and a console box 30 defined by a rear part of the center console 22.

As shown in FIG. 1 to FIG. 5, the console box 30 includes a console body 31 for storing (first) articles M1, M2, a lid portion 32 located on a top surface 31a of the console body 31 in such a manner as to pivot between an open position and a closed position, a storage portion 33 formed on a back surface 32a of the lid portion 32 for storing a small item (second article) M3, and an urging member 34 disposed between the storage portion 33 and the lid portion 32 and urging the storage portion 33 in such a direction as to allow the storage portion 33 to pivot to an open position. The urging member 34 is a torsion spring.

The console body 31 is defined in the center console 22 and provided with a tray member 37 disposed on a bottom 31b of the console body 31. The tray member 37 has a partition disposed between the article M1 and the article M2. The console body 31 includes support portions 38 (only one shown) at a top of a rear part of the console body 31, and the support portions 38 support one end 47 of the lid portion 32 in such a manner as to allow the lid portion 32 to pivot between the open position and the closed position. The console body 31 further includes a locking portion 39 at a top of a front part of the console body 31 for locking engagement with an opposite end 48 of the lid portion 32. The top surface 31a of the console box 31 provides abutment surfaces 36, 36 on which projections 91, 91 of the storage portion 31 are to abut.

The lid portion 32 includes support shafts 54, 54, and the one end 47 of the lid portion 32 is attached to the console body 31 through the support shafts 54, 54 in such a manner as to allow the lid portion 32 to pivot between the open position and the closed position. The opposite end 48 of the lid portion 32 is a free end.

The lid portion 32 includes an outer lid member 41 exposed to the passenger compartment 12, and an inner lid member 42 for locking engagement with the console body 31. The inner lid member 42 has an inside facing toward the console body 31, and the lid portion 32 includes a holder member 43 attached to the inside of the inner lid member 42. The storage portion 33 is pivotably attached to the holder member 43. The lid portion 42 further includes left and right cover members 44, 44 covering opposite lateral sides of the holder member 43. The lid portion 42 further includes a shield wall 46 attached to the inside of the inner lid member 42 for shielding a free end 88 of the storage portion 33 when the storage portion 33 is in a closed position.

The outer lid member 41 has an aesthetically designed surface to which may be applied leather matching a mood of the passenger compartment 12.

The inner lid member 42 includes a hinge 51 rotatably attached to the support portions 38 of the console body 31. The inner lid member 42 defines a plurality of holes 52 into which are fitted a plurality of hooks 66 of the holder member 43. The inner lid member 42 defines holes 53 (only one shown) which lugs 67, 67 of the holder member 43 engage. The inner lid member 42 also includes an attachment portion (not shown) to which is attached the shield wall 46. The inner lid member 42 further includes a hook 55 for locking engagement with the locking portion 39, and a tab 56 operable to release the hook 55 from the locking portion 39. The inner lid member 39 further includes recesses 57 adapted to avoid interfering with the projections 91, 91 when the lid portion 32 is in the open position.

The hinge 51 includes the support shafts 54, 54 projecting from right and left side surfaces 51a, 51a thereof. The support shafts 54, 54 are rotatably fitted to the support portions 38.

The holder member 43 is a U-shaped-cross-sectional member including a top wall 61 attached to the inside of the inner lid member 42, left and right side walls 62, 63 extending from the top wall 61, and a rear wall 64 interconnecting the side walls 62, 63.

The top wall 61 includes the plurality of hooks 66 fitted into the holes 52, 52 of the inner lid member 42, and the lugs 67, 67 having an L-shape and engaging the holes 53, 53 of the inner lid member 42. The top wall 61 defines a hole 68 formed for the purpose of reducing a weight of the holder member 43.

The left side wall 62 includes a plurality of bosses 71 attached to the cover members 44, 44, and a pin 73 on which one end 34a of the urging member 34 is caught. The left side wall 62 defines slits 74 for receiving the projections 91, 91 of the storage portion 33, and holes 75, 75 into which support shafts 84, 84 of the storage portion 33 are fitted. The urging member 34 has an opposite end 34b caught on the projection 91 of the storage portion 33.

The rear wall 64 has a hole 69 formed for the purpose of reducing the weight of the holder member 43.

The right side wall 63 has a shape generally symmetrical to a shape of the left side wall 62, and differs from the left side wall 62 in that the left side wall 62 includes the pin 73 on which the one end 34a of the urging member 34 is caught.

The left cover member 44 includes an arc-shaped guide hole 78 for guiding the projection 91 of the storage portion 33. The left cover member 44 defines a plurality of through-holes 79 through which screws 77 are threaded into the bosses 71 of the left side wall 63 to fasten the left cover member 44 to the holder member 43.

The right cover member 44 has a shape symmetrical to a shape of the left cover member 44.

The storage portion 33 includes an outer member 81 rotatably attached to the holder member 43, an inner member 82 fitted in the outer member 81, and a cover member 83 covering the inner member 82.

The storage portion 33 has one end 87 provided with the support shafts 84, and the free end 88 opposite the one end 87. The free end 88 of the storage portion 33 defines a shallow space. For example, the one end 87 of the outer member 81 has a depth D1 greater than a depth D2 of the opposite end 88 of the outer member 81. The storage portion 33 is suitable for storing a small item M3 such as a sunglass.

The outer member 81 is a box-shaped member including a recess 85 in which is fitted the inner member 82. The outer member 81 includes left and right step-shaped bosses 94 (only one shown) including the support shafts 84, 84 and retaining portions 89, 89 one of which retains the urging member 34. The outer member 81 further includes the projections 91, 91 projecting from left and right side surfaces 33a, 33a (only one shown) of the storage portion 33.

The projection 91 includes a cylindrical portion 91a having a circular cross-section for sliding in the guide hole 78. The projection 91 further includes a flat portion 91b having an oval cross-section and extending from the cylindrical portion 91a for abutment on the abutment surface 36.

The support shaft 84 provides a top step of the step-shaped boss 94 and is rotatably fitted in the hole 75 of the holder member 43. The retaining portion 89 provides a bottom step of the step-shaped boss 94 and retains the urging member 34. The left and right step-shaped bosses 91, 91 have the same shape, and the left step-shaped boss 91 differs from the right step-shaped boss 91 in that the retaining portion 89 of the left step-shaped boss 94 retains the urging member 34.

The storage portion 33 has the one end 87 attached through the support shafts 84 to the lid portion 32 in such a manner as to allow the storage portion 33 to pivot between the open position and the closed position. The opposite end 88 of the storage portion 33 is the free end facing in the same direction as the free end 48 of the lid portion 32.

The inner member 82 is adapted to store a small item M3, and the cover member 83 covers a top of the inner member 82 as the lid portion 32 is in the closed position.

The outer member 81 defines an opening 92 through which a very small article (third article) (for example, a coin or a pin) M4 smaller in size than the small item M3 (for example, a sunglass) can be taken out of the storage portion 33.

Figure 4:
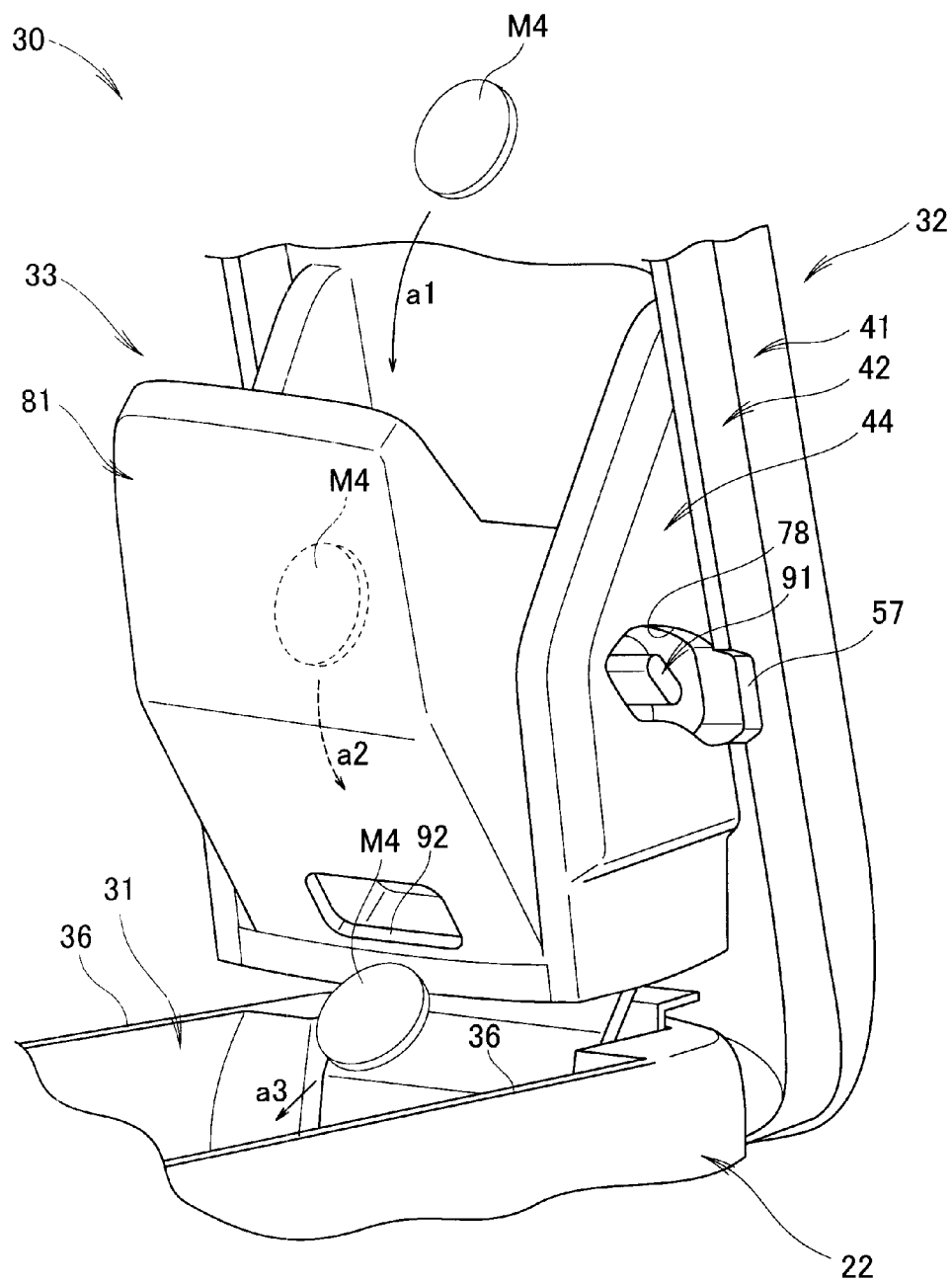
FIG. 4 is a perspective view of a storage portion of the console box.

As shown in FIG. 4, the article M4 such as a coin or a pin, which has been dropped into the storage portion 33 as indicated by an arrow a1, can pass as indicated by an arrow a2 and finally be automatically discharged out of the opening 92 as indicated by an arrow a3. Even if the article M4 remains in the storage portion 33 without being automatically discharged out, the article M4 can be forcibly taken out through the opening 92.

Figure 6A:
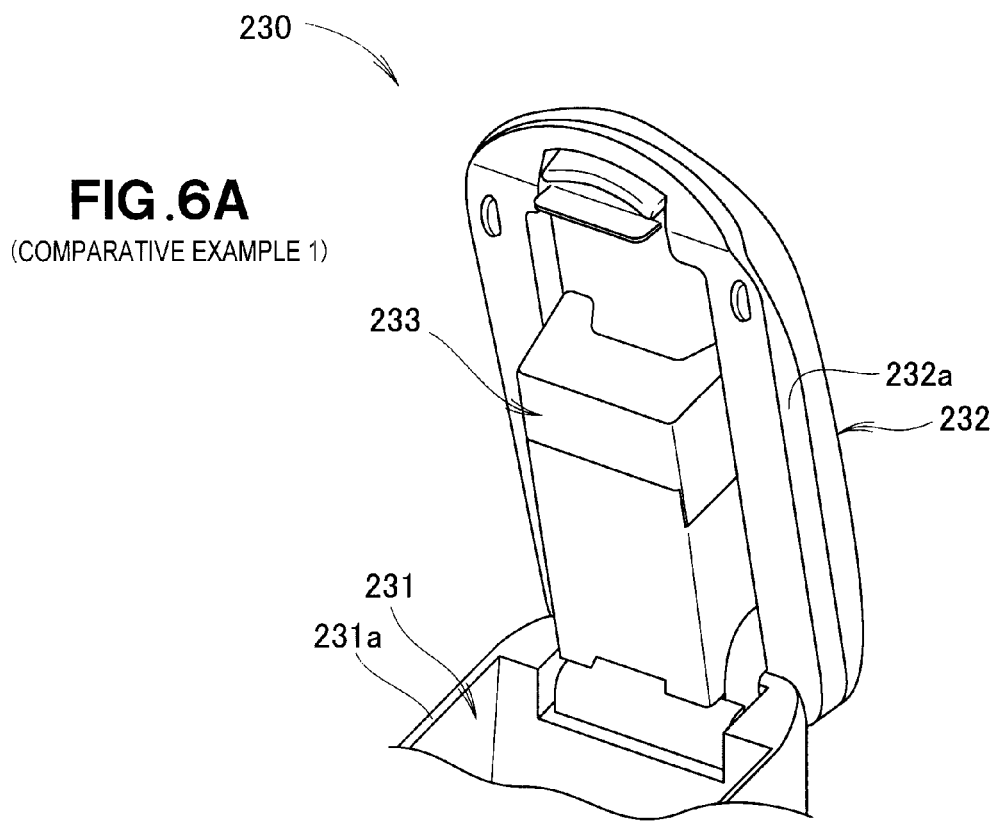
FIG. 6A is a view illustrating a console box in a comparative example 1.
Figure 6B:
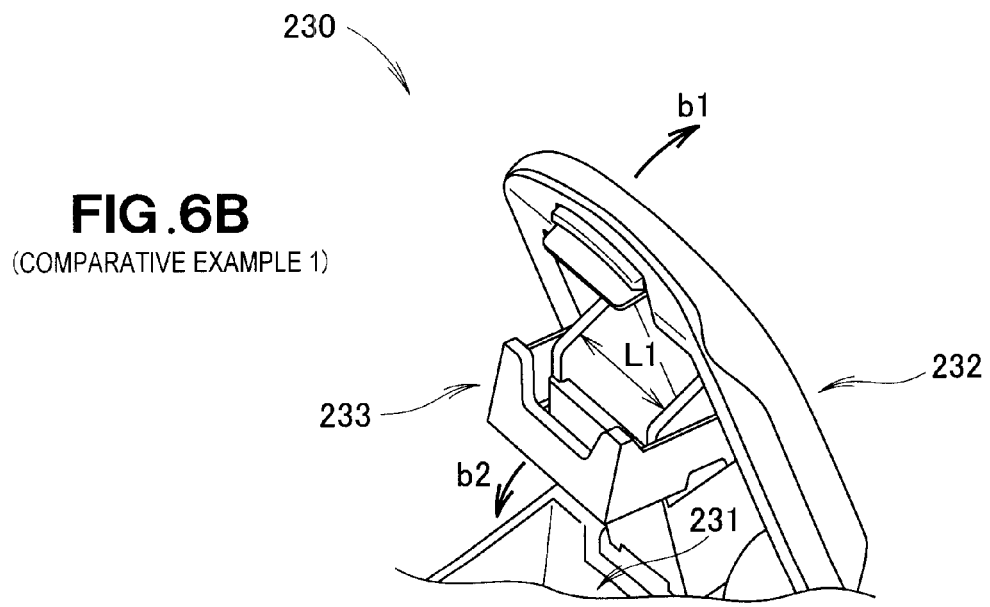
FIG. 6B is a view illustrating the console box in the comparative example 1.

In FIG. 6A and FIG. 6B, there is shown a console box 230 in a comparative example 1.

The console box 230 is placed in a passenger compartment of a vehicle and includes a console body 231 for storing an article, and a lid member 232 pivotably attached to a top surface 231a of the console body 231. The console box 230 further includes a storage portion 233 formed on a back surface 232a of the lid member 232 for storing a small item.

As shown in FIG. 6B, after the lid member 232 pivots to an open position as indicated by an arrow b1, the storage portion 233 can pivot to an open position as indicated by an arrow b2. During the pivoting of the storage portion 233 to the open position, in other words, the lid member 232 should be kept from pivoting in the same direction as the storage portion 233, which makes it difficult to store a small item in the storage portion 233.

The storage portion 233 has a small width L1 and thus the storage portion 233 should be widened.

The console box 30 is designed such that the storage portion 33 pivots to the open position in response to the pivoting of the lid portion 32 to the open position while the storage portion 33 pivots to the closed position in response to the pivoting of the lid portion 32 to the closed position. In addition, the urging member 34 is disposed between the storage portion 33 and the lid portion 32 and urges the storage portion 33 in such a direction that the storage portion 33 pivots to the open position. More specifically, the storage portion 33 pivots away from the lid portion 32 to the open position in response to the pivoting of the lid portion 32 to the open position. This means that a small item M3 can be readily stored in the storage portion 33 because it is unnecessary to open the storage portion 32 keeping the lid portion 32 from pivoting toward the storage portion 32.

Figure 7A:
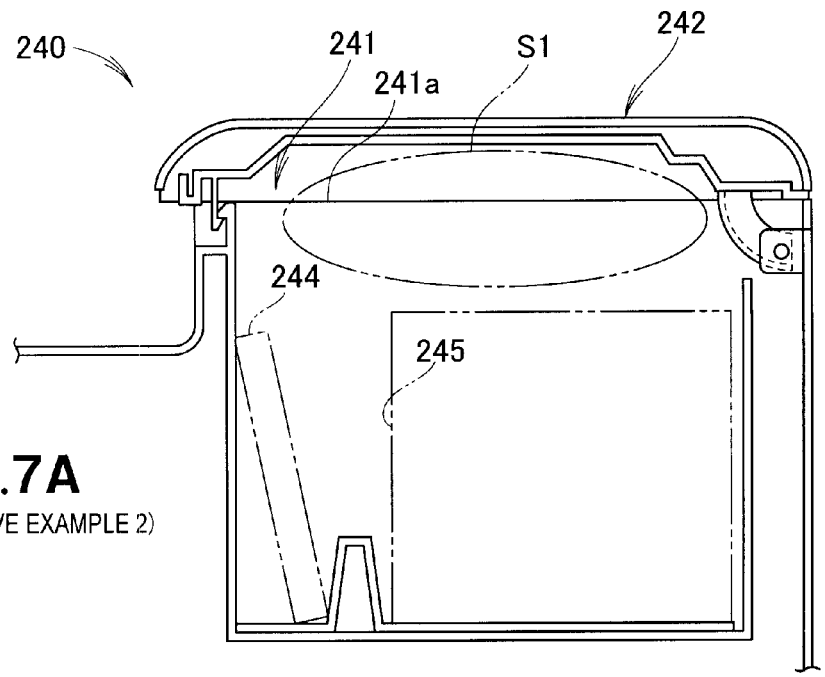
FIG. 7A is a view illustrating a console box in a comparative example 2.
Figure 7B:
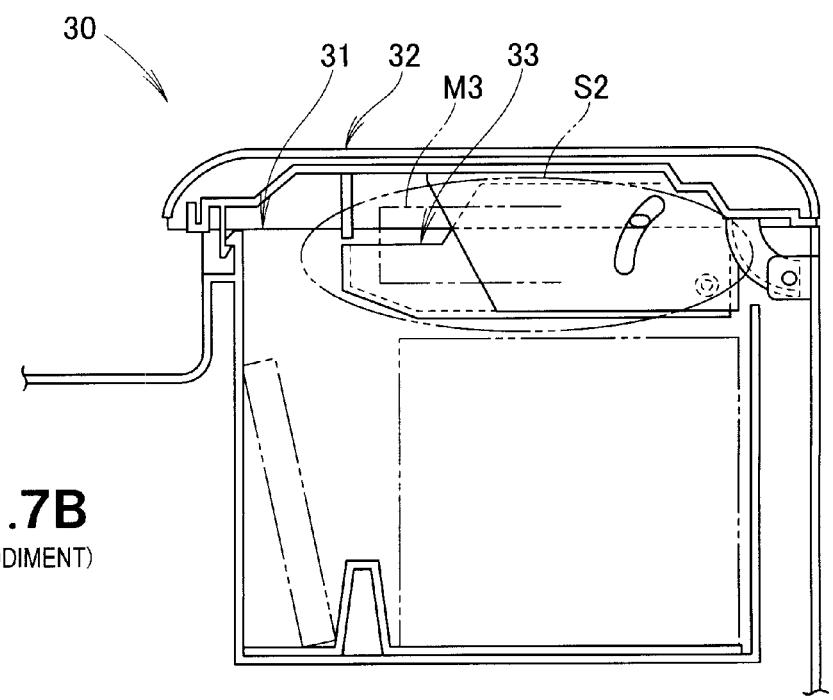
FIG. 7B is a view illustrating the console box in the first embodiment of the present invention.

FIG. 7A shows a console box 240 in a comparative example 2 while FIG. 7B shows the console box 30 in the first embodiment of the present invention.

The console box 240 is placed in a passenger compartment of a vehicle and includes a console body 241 for storing an article, and a lid member 242 attached to a top surface 241a of the console box 240 in such a manner as to pivot between an open position and a closed position. The console body 242, which stores articles 244, 245, would provide an upper free space S1 below the lid member 242. Such a free space S1 may not be effectively used.

As for the console box 30 in the first embodiment of the present invention, the storage portion 33 is attached to the lid portion 32 in such a manner as to pivot to the open position in response to the pivoting of the lid portion 32 to the open position and pivot to the closed position in response to the pivoting of the lid portion 32 to the closed position. This means that a space S2 defined below the lid portion 32 is effectively used to accommodate the storage portion 33 in the closed position. The storage portion 33 may store a small item M3.

Figure 8:
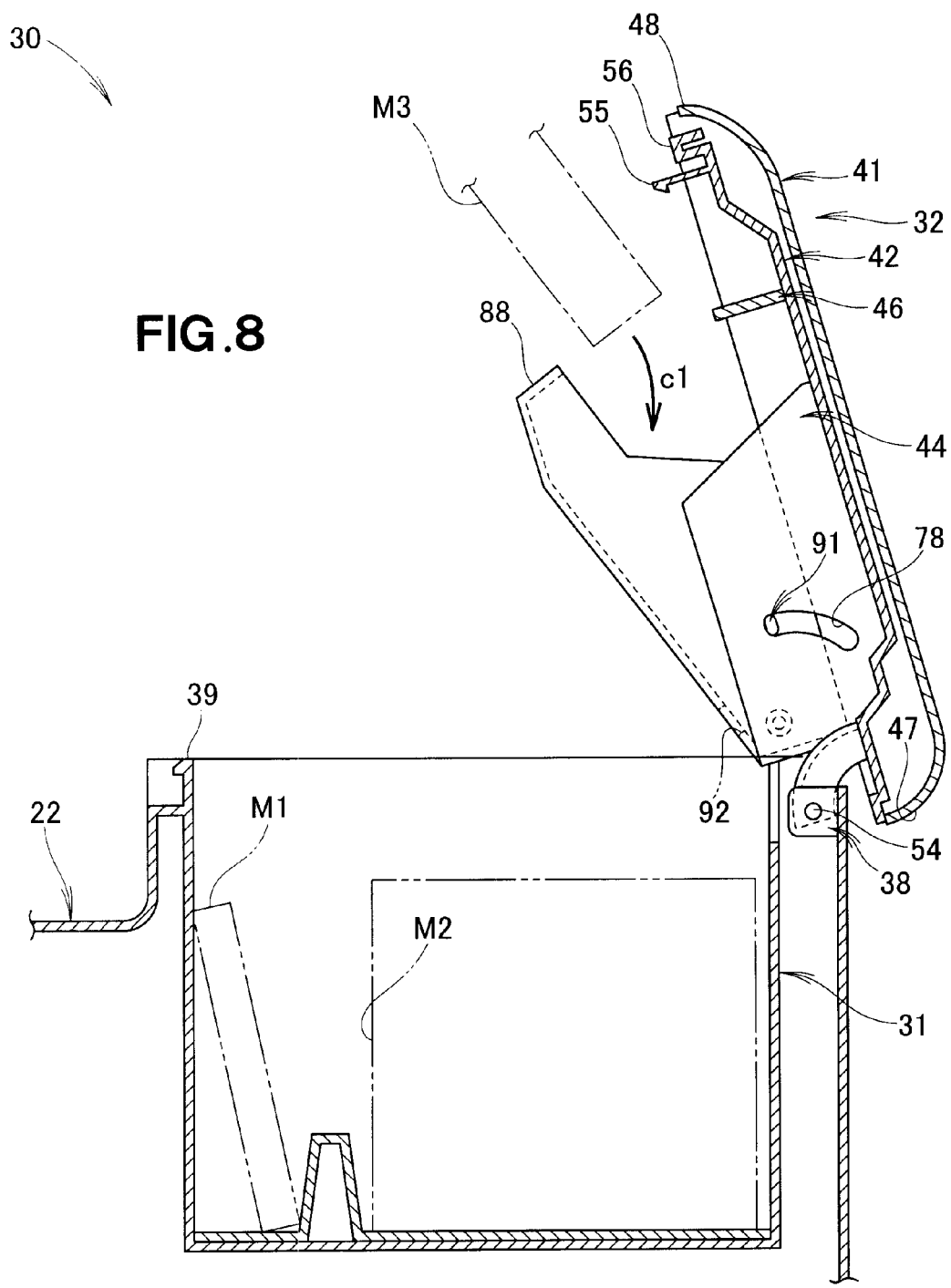
FIG. 8 is a cross-sectional view of the console box of FIG. 2 with the lid portion in the open position.

As shown in FIG. 8, the storage portion 33 is urged to the open position by the urging member 34 having the one end 34a caught on the pin 73 of the holder member 43 and the opposite end 34b caught on the left projection 91 of the storage portion 33 when the lid portion 32 is in the open position. The free end 88 of the storage portion 33 is located away from the lid portion 32 such that a small item M3 such as a sunglass can be stored in the storage portion 33, as indicated by an arrow c1 or removed from the storage portion 33. For example, as shown in FIG. 4, when an article M4 smaller in size than the small item is dropped into the storage portion 33 with both the storage portion 33 and the lid portion 32 in the open position, such an article M4 can be taken out of the storage portion 33 through the opening 92, as indicated by an arrow a4.

Figure 9:
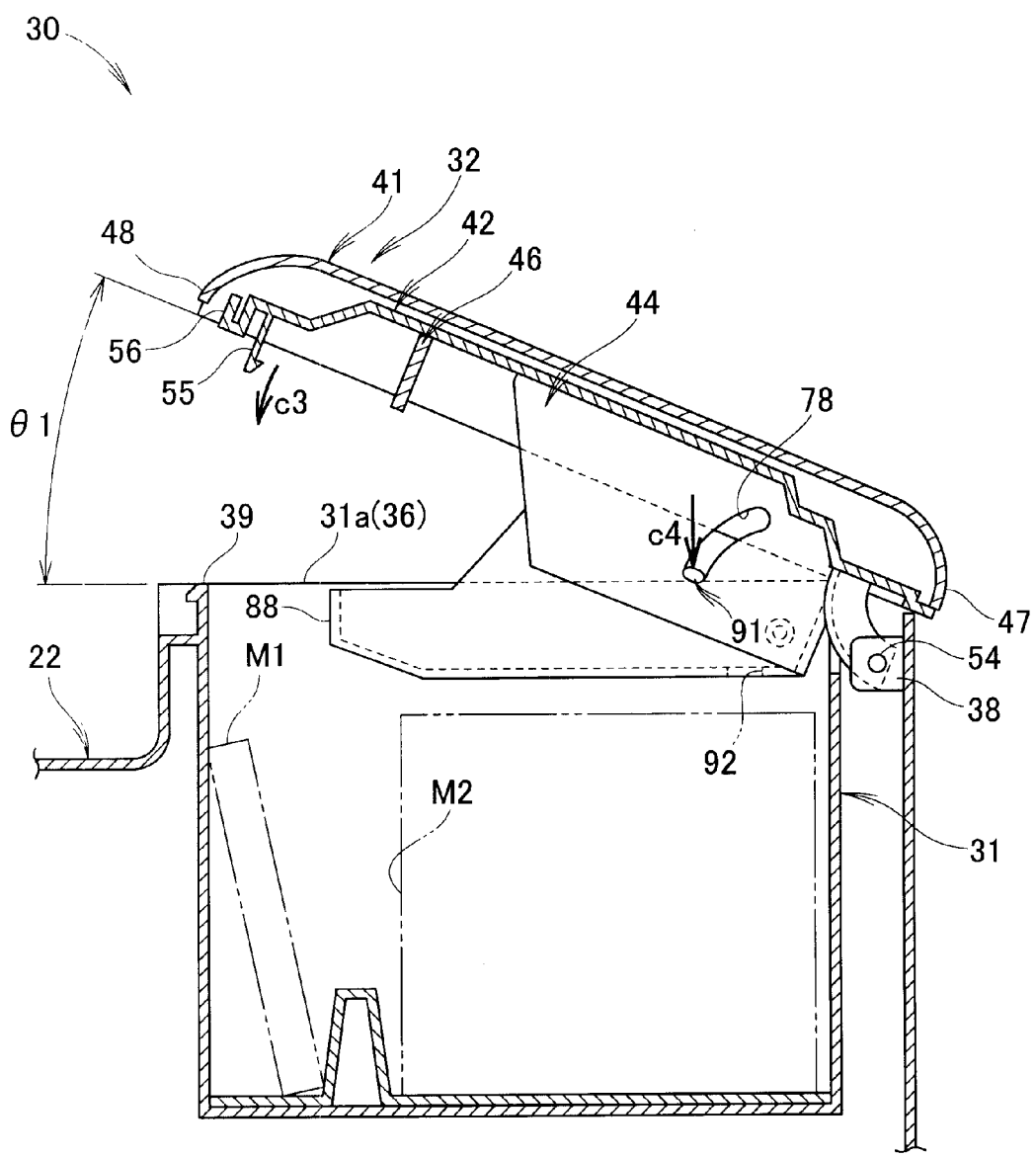
FIG. 9 is a cross-sectional view of the console box of FIG. 2 with the lid portion in a half-open position.

As shown in FIG. 9, the storage portion 33 pivots toward the console body 31 assuming the open position, together with the lid portion 32, as indicated by an arrow c3. At this time, the projections 91 come into abutment on the top surface 31a (abutment surfaces 36) of the console body 31 to thereby stop the pivoting of the storage portion 33. Thereafter, only the lid portion 32 pivots further toward the console body 31, as indicated by the arrow c3, while the storage portion 33 is held in horizontal orientation.

Figure 10:
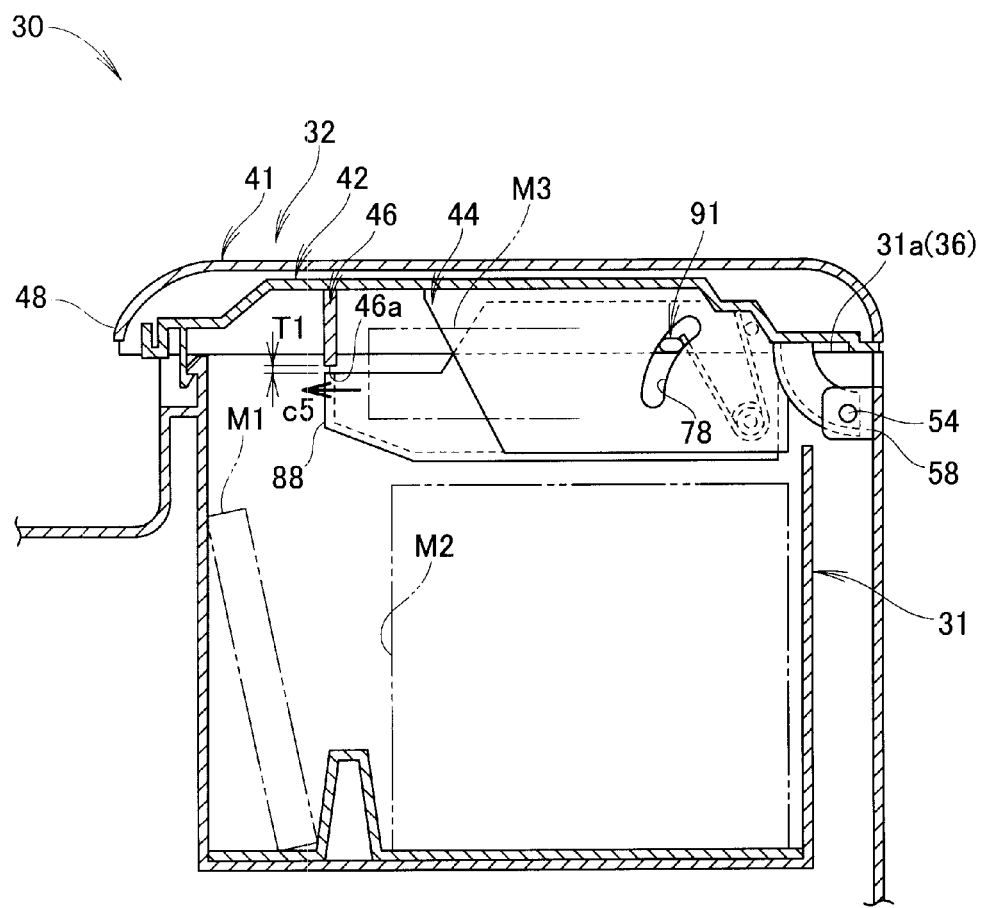
FIG. 10 is a cross-sectional view of the console box of FIG. 2 with the lid portion in a closed position.
Figure 11:
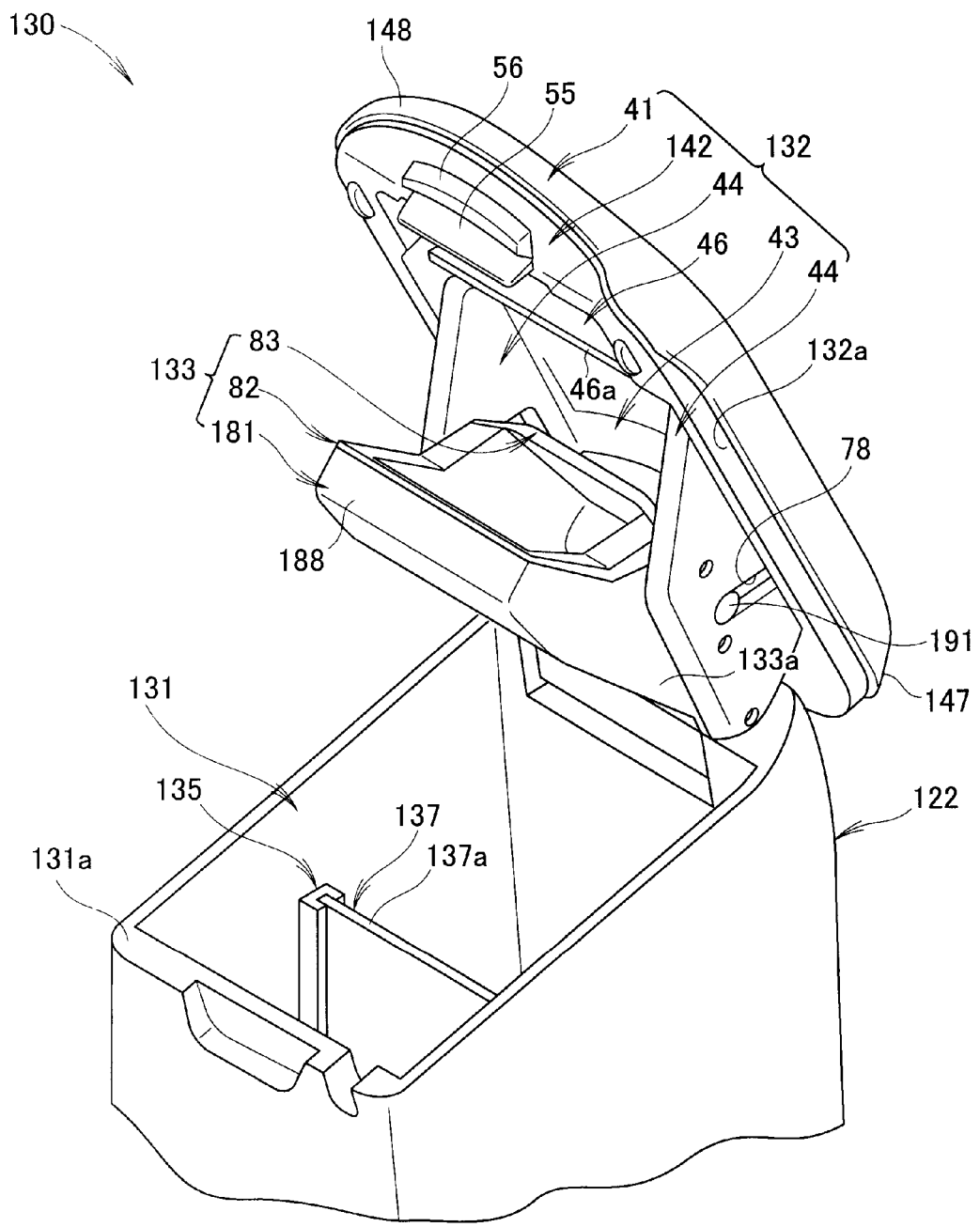
FIG. 11 is a perspective view of a console box with a lid portion in an open position in a second embodiment of the present invention.
Figure 12:
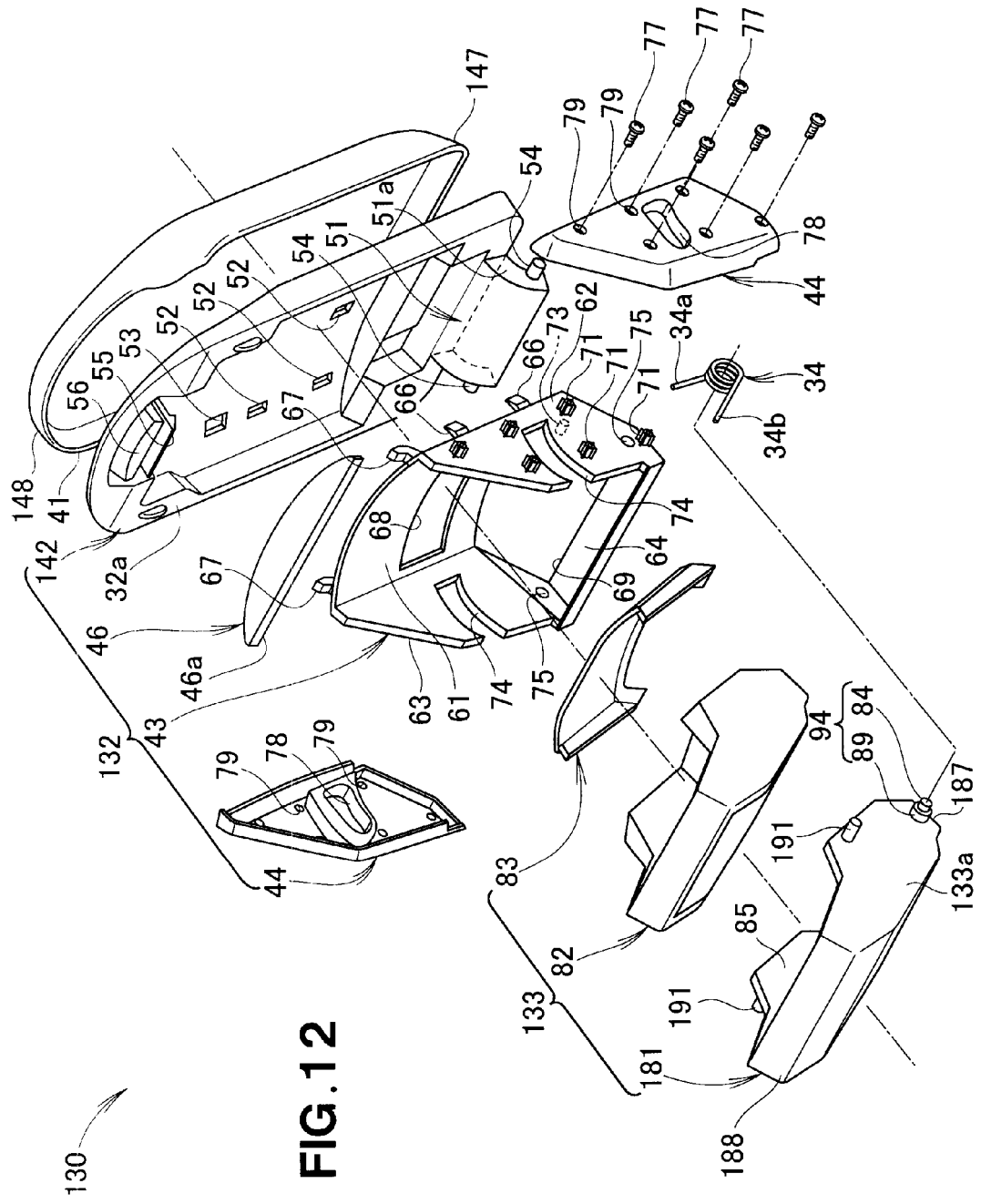
FIG. 12 is an exploded perspective view of the console box of FIG. 11.
Figure 13:
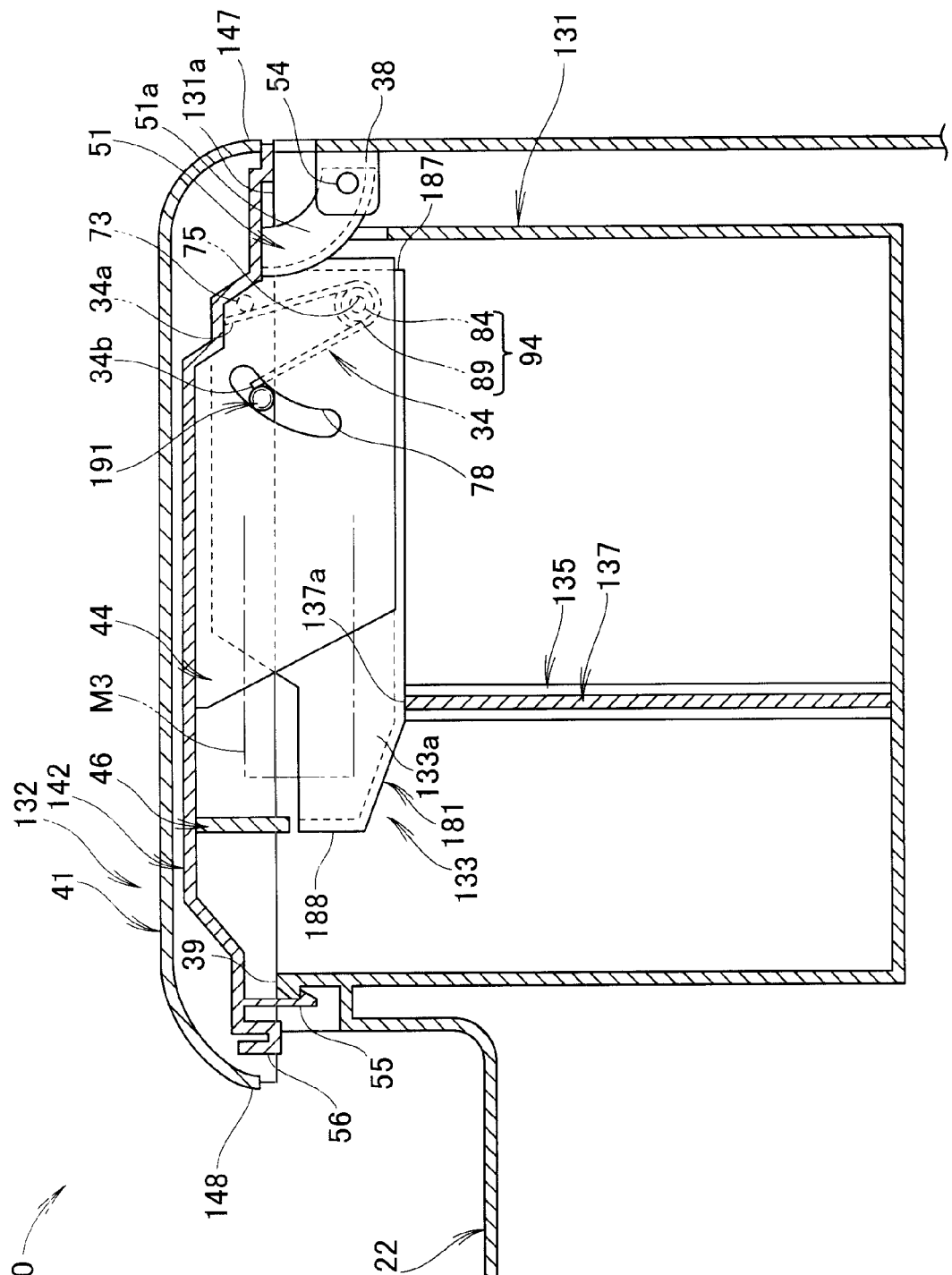
FIG. 13 is a cross-sectional view of the console box of FIG. 11 with the lid portion in a closed position.

As shown in FIG. 10, since the projections 91 are held in abutment on the top surface 31a of the console body 31 when the lid portion 32 is in the closed position, the storage portion 33 is held in horizontal orientation. The shield wall 46 of the lid portion 32 is located proximate the free end 88 of the horizontally oriented storage portion 33. A clearance T1 between the free end 88 of the storage portion 33 and a distal end 46a of the shield wall 46 is so small that the small item M3 cannot pass through the clearance T1. There is no concern that the small item M3 comes out of the storage portion 33 toward the console body 31, as indicated by an arrow c5.

As discussed above, the storage portion 33 pivots to the open position in response to pivoting of the lid portion 32 to the open position, and pivots to the closed position in response to pivoting of the lid portion 32 pivoting to the closed position. As the lid portion 32 pivots to the open position, the free end 88 of the storage portion 33 moves away from the free end 48 of the lid portion 32. During the pivoting of the lid portion 32 between the open position and the closed position, an angle between the lid portion 32 and a plane in which the top surface 31a of the console body 31 lies is less than θ1 (theta 1). The projections 91, which are located between the lid portion 32 and the plane in which the top surface 31a of the console body 31 lies, abut on the top surface 31a at the angle down to 0 degree.

The back surface 32a of the lid portion 32 can be effectively used because the storage portion 33 is formed on the back surface 32a for storing the small item M3. The storage portion 33 pivots to the open position in response to the pivoting of the lid portion 32 to the open position and pivots to the closed position in response to the pivoting of the lid portion 32 to the closed position. That is, the pivoting of the lid portion 32 between the open position and the closed position causes the storage portion 33 to pivot between the open position and the closed position. In storing the small item M3 in the storage portion 33 or removing the small item M3 from the storage portion 33, thus, an operation of opening the storage portion 33 is not required. An operation of closing the storage portion 33 after opening the storage portion 33 is not required, either. The console box 30, which requires neither the operation of opening the storage portion 33 nor the subsequent operation of closing the storage portion 33, is easy to use.

Since the free end 88 of the storage portion 33 and the free end 48 of the lid portion 32 face in the same direction, the article and the small item can be carried in the same direction for storage in the console body 31 and the storage portion 33, respectively. For example, the pivoting of the lid portion 32 to the open position allows easy placement of a small item M3 such as a sunglass into the storage portion 33. Namely, articles M1, M2 and a small item M3 can be easily stored in or taken out of the console body 31 and the storage portion 33, respectively.

Figure 2:
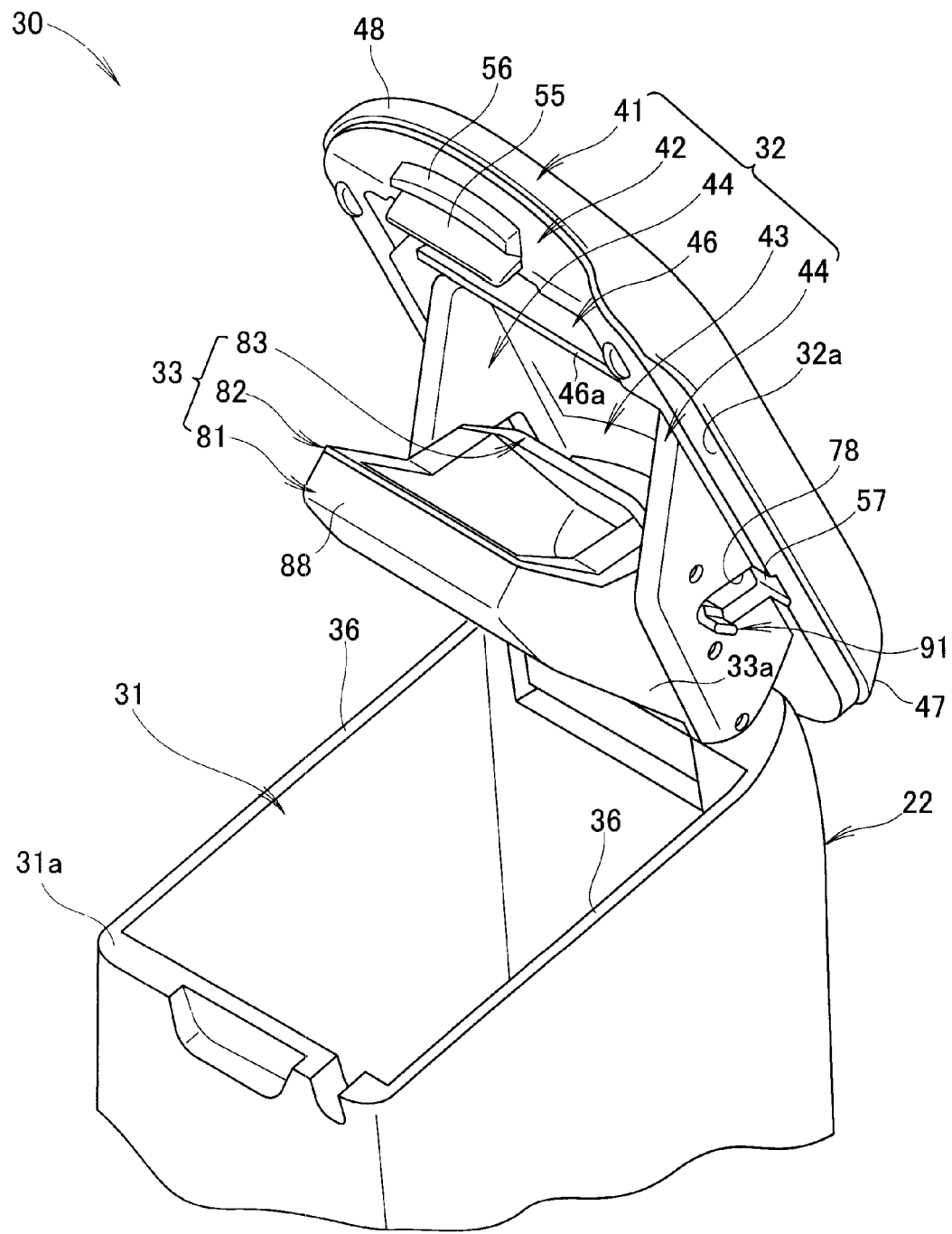
FIG. 2 is a perspective view of the console box with a lid portion in an open position.

As shown in FIG. 2 and FIG. 8, the movement of the free end 88 of the storage portion 33 away from the free end 48 of the lid portion 32 during pivoting of the lid portion 32 to the open position provides a large opening between the free ends 88, 48 of the storage portion 33 and the lid portion 32, such that a small item M3 can be stored in or taken out of the storage portion 33.

Figure 5:
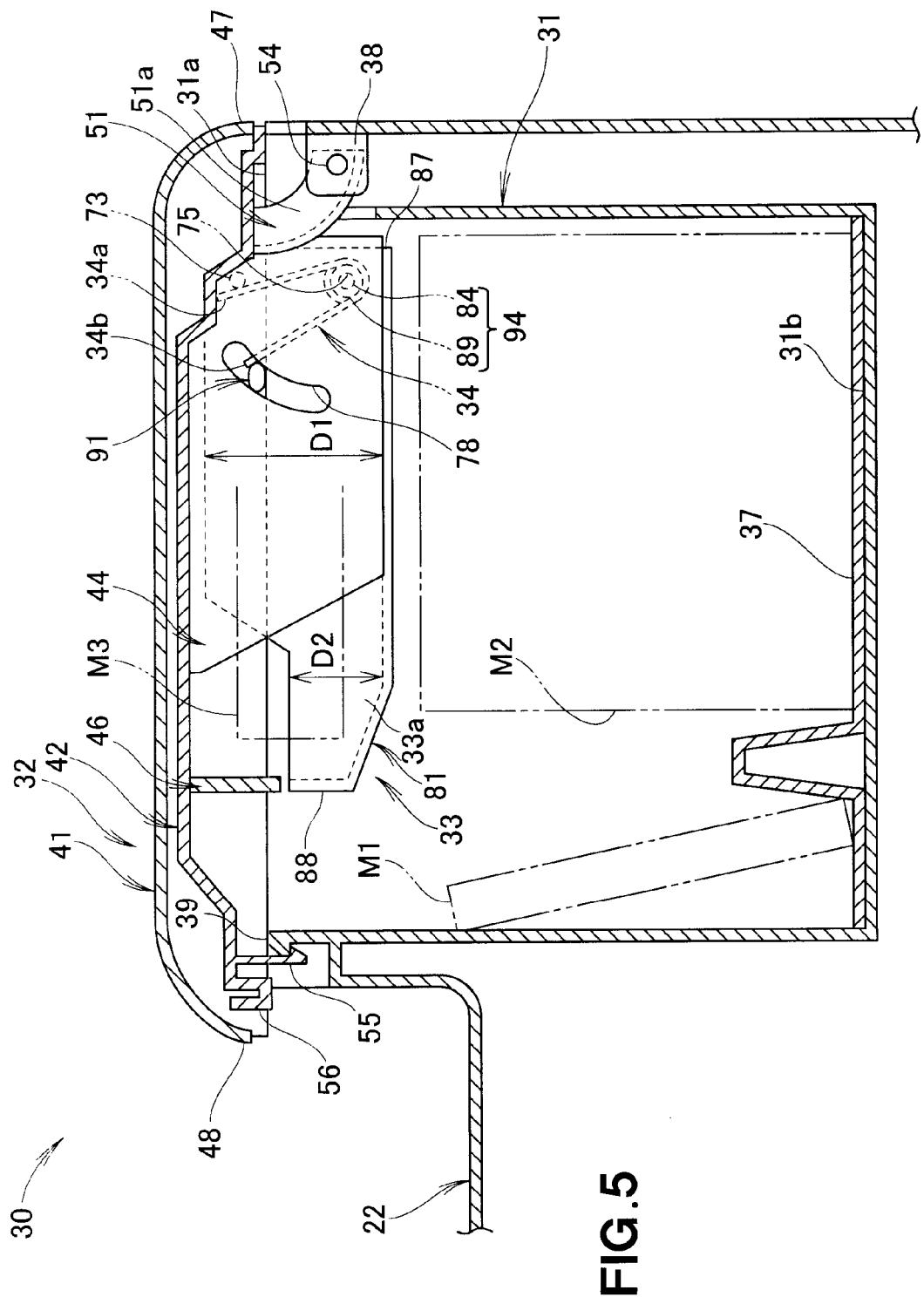
FIG. 5 is a cross-sectional view taken along line 5-5 of FIG. 1.

Since the urging member 34 is disposed between the storage portion 33 and the lid portion 32 and urges the storage portion 33 in such a direction as to allow the storage portion 33 to pivot to the open position, as shown in FIG. 5, the storage portion 33 can pivot to the open position without aid of gravity in response to the pivoting of the lid portion 32 to the open position.

As shown in FIG. 8 to FIG. 10, the projections 91, 91 projecting from the side surfaces 33a, 33a of the storage portion 33 abut on the console body 31 with the lid portion 32 in the closed position. When the lid portion 32 pivots to the open position, the projections 91, 91 come out of abutment on the console body 31 and the storage portion 33 pivots to the open position. When the lid portion 32 pivots to the closed position, the projections 91, 91 come into abutment on the console body 31 and the storage portion 33 pivots to the closed position. The pivoting of the lid portion 32 makes it possible to store a small item M3 such as a sunglass in the storage portion 33 or take the small item M3 out of the storage portion 33 without opening or closing the storage portion 33.

As shown in FIG. 4, the storage portion 33 defines the opening 92 proximate the support shafts 84, 84, such that a very small article M4 (for example, a coin or a pin) smaller in size than a small item M3 (for example, a sunglass) can be taken out of the storage portion 33 through the opening 92. The opening 92 discharges the very small article M4 such as a coin or a pin which has been inadvertently dropped into the storage portion 33. This opening 92 increases utility of the storage portion 33.

As shown in FIG. 5 and FIG. 10, the shield wall 46 is disposed on the back surface 32a of the lid portion 32 for preventing a small item M3 from coming out of the storage portion 33. The shield wall 46 is located proximate the free end 88 of the storage portion 33 with the lid portion 32 in the closed position. For example, with the lid portion 32 in the closed position, a clearance T1 between the free end 88 of the storage portion 33 and the distal end 46a of the shield wall 46 located proximate the free end 88 of the storage portion 33 may be so small that the small item M3 cannot pass through the clearance T1. This makes it possible to prevent the small item M3 from coming out of the storage portion 33 toward the console body 31.

As shown in FIG. 5, the lid portion 32 defines the guide hole 78. The provision of the guide hole 78 allows the projection 91 to move smoothly relative to the lid position 32.

Turning to FIG. 11 to FIG. 14, there is shown a console box 130 in a second embodiment of the present invention. Elements of the console box 130 which correspond to those of the console box 30 in the first embodiment are denoted by the same reference numerals and will not be described in detail.

The console box 130 includes a console body 131 defined by a center console 122, a lid portion 132, a storage portion 133 for storing a small item M3, and an urging member 34 disposed between the storage portion 133 and the lid portion 132 and urging the storage portion 133 in such a direction that the storage portion 133 pivots to an open position. The urging member 34 is a torsion spring between the storage portion 133 and the lid portion 132.

The console body 131 includes a partition member 137 partitioning a space in the console body 131. The console body 131 further includes support portions 38 (only one shown) at a top of a rear part thereof for supporting one end 147 of the lid portion 132 in such a manner as to allow the lid portion 132 to pivot between an open position and a closed position. The console body 131 further includes a locking portion 39 at a top of a front part thereof for locking engagement with an opposite end 148 of the lid portion 132. Within the console body 131, rails 135 (only one shown) are disposed. The partition member 137 is slidably releasably attached to the rails 135.

The lid portion 132 includes support shafts 54, 54 through which the one end 147 of the lid portion 132 is pivotably attached to the console body 131. The opposite end 148 of the lid portion 132 is a free end. The lid portion 132 further includes an outer lid member 41, an inner lid member 42, a holder member 43, left and right cover members 44, 44, and a shield wall 46. Reference numeral 46a denotes a distal end of the shield wall 46.

The inner lid member 142 includes a hinge 51, a plurality of holes 52, holes 53 (only one shown), an attachment portion (not shown) to which is attached the shield wall 46, a hook 55, and a tab 56. The inner lid member 142 has no recesses such as the recesses 57, 57 shown in FIG. 3 because the inner lid member 142 is unlikely to interfere with projections 191, 191. The support shafts 54, 54 project from left and right side surfaces 51a, 51a of the hinge 51.

The holder member 43 includes a top wall 61, left and right side walls 62, 63, and a rear wall 64.

The top wall 61 includes a plurality of hooks 66 and lugs 67, 67. The top wall 61 defines a hole 68. The left side wall 62 includes a plurality of bosses 71 and a pin 73. The left side wall 62 defines slits 74, 74 and holes 75, 75. The rear wall 64 defines a hole 69.

The right side wall 63 has a shape generally symmetrical to a shape of the left side wall 62 except that since no urging member such as the urging member 34 is provided on the right side wall 63, the right side wall 63 has no pin such as the pin 73 on which the one end 34a of the urging member 34 is caught. The urging member 34 has an opposite end 34b caught on the projection 191.

The right cover member 44 defines a guide hole 78, a plurality of through-holes 79 through which screws 77 are threaded into the bosses 71 to fasten the right cover member 44 to the holder member 43. The left cover member 44 has a shape symmetric to a shape of the right cover member 44.

The storage portion 133 includes an outer member 181 pivotably attached to the holder member 43, an inner member 82 fitted into the outer member 181, and a cover member 83 covering the inner member 82.

The outer member 181 is a box-shaped member including a recess 85 into which the inner member 82 is fitted. The outer member 81 includes left and right step-shaped bosses 94 (only one shown) including the support shafts 84, 84 and retaining portions 89, 89 one of which retains the urging member 34. The outer member 81 further includes the projections 191, 191 projecting from left and right side surfaces 133a (only one shown) of the storage portion 33.

The storage portion 133 has one end 187 attached through the support shafts 84 to the lid portion 132 in such a manner as to allow the storage portion 133 to pivot between the open position and the closed position. The storage portion 133 has a free end 188 opposite the one end 187 and the free end 188 faces in the same direction as the free end 148 of the lid portion 32.

Figure 3:
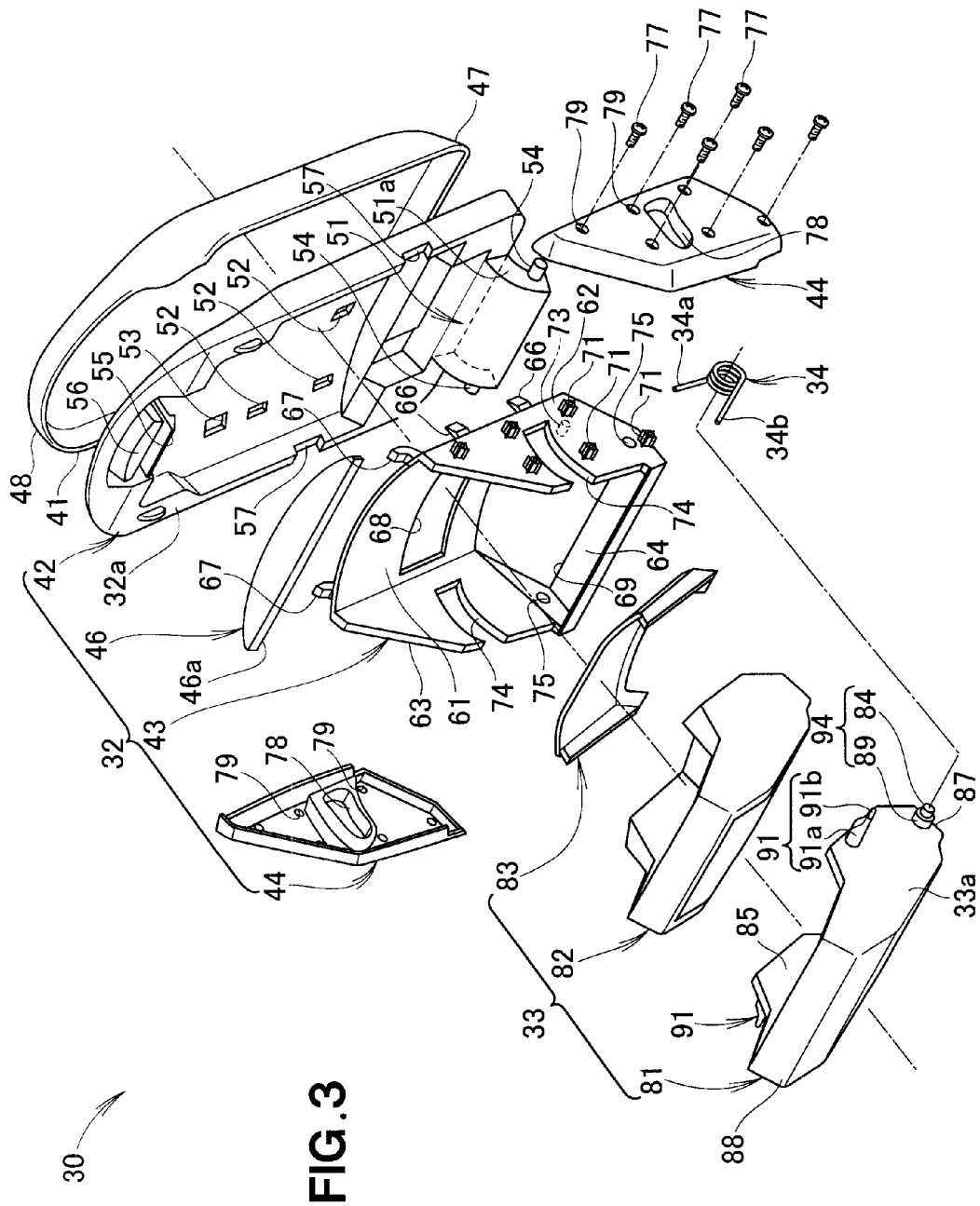
FIG. 3 is an exploded perspective view of the console box.

The projection 191 is shorter than the projection 91 shown in FIG. 3, and is too short to abut on a top surface 131a of the console body 131. The guide hole 78 has one end adapted to stop movement of the projection 191 so as to hold the storage portion 133 in the open position. The partition member 137 has a top edge 137a to stop the storage portion 133 as the storage portion 133 is in the closed position.

The support shaft 84 defines a top step of the step-shaped boss 94 and is rotatably fitted in the hole 75 of the holder member 43. The retaining portion 89 defines a bottom step of the step-shaped boss 94 and retains the urging member 34. The left and right step-shaped bosses 91, 91 have the same shape, and the left step-shaped boss 91 differs from the right step-shaped boss 91 in that the retaining portion 89 of the left step-shaped boss 94 retains the urging member 34. The outer member 181 has left and right side surfaces defining the left and right side surfaces 133a (not shown) of the storage portion 133.

The inner member 82 is adapted to store a small item M3, and the cover member 83 covers a top of the inner member 82 as the lid portion 132 is in the closed position.

The outer member 181 defines an opening (not shown) through which an article (for example, a coin or a pin) M4 smaller in size than the small item M3 (for example, a sunglass) can be taken out of the storage portion 133.

The console box 130 is placed in a passenger compartment of a vehicle and includes the console body 131 for storing an article, and the lid portion 132 located on the top surface 131a of the console body 131. The console box 130 further includes the storage portion 133 formed on a back surface 132a of the lid portion 132. The storage portion 133 is pivotable to the open position in response to pivoting of the lid portion 132 to the open position, and is pivotable to the closed position in response to pivoting of the lid portion 132 to the closed position.

The partition member 137 is releasably attached to the rails 135, and is adapted to hold the storage portion 133 in the closed position. The lid portion 132 defines the guide hole 78 for guiding the projection 191 of the storage portion 133. The guide hole 78 has the one end for stopping movement of the projection 91 of the storage portion 133 so as to hold the storage portion 133 in the open position. The storage portion 133 has the projection 191 movable in the guide hole 78. The urging member 34 is disposed between the storage portion 133 and the lid portion 132 and urges the storage portion 133 in such a direction that the storage portion 133 pivots to the open position.

The partition member 137 serves to separate articles. Thus, articles in the console body 131 of the console box 130 can be tidied by the partition member 137. The partition member 137 increases utility of the console box 130.

Since the partition member 137 is releasably attached to the rails 135, a very small article M4 which has been dropped into the console body 131, can be readily taken out of the console body 131.

Figure 14:
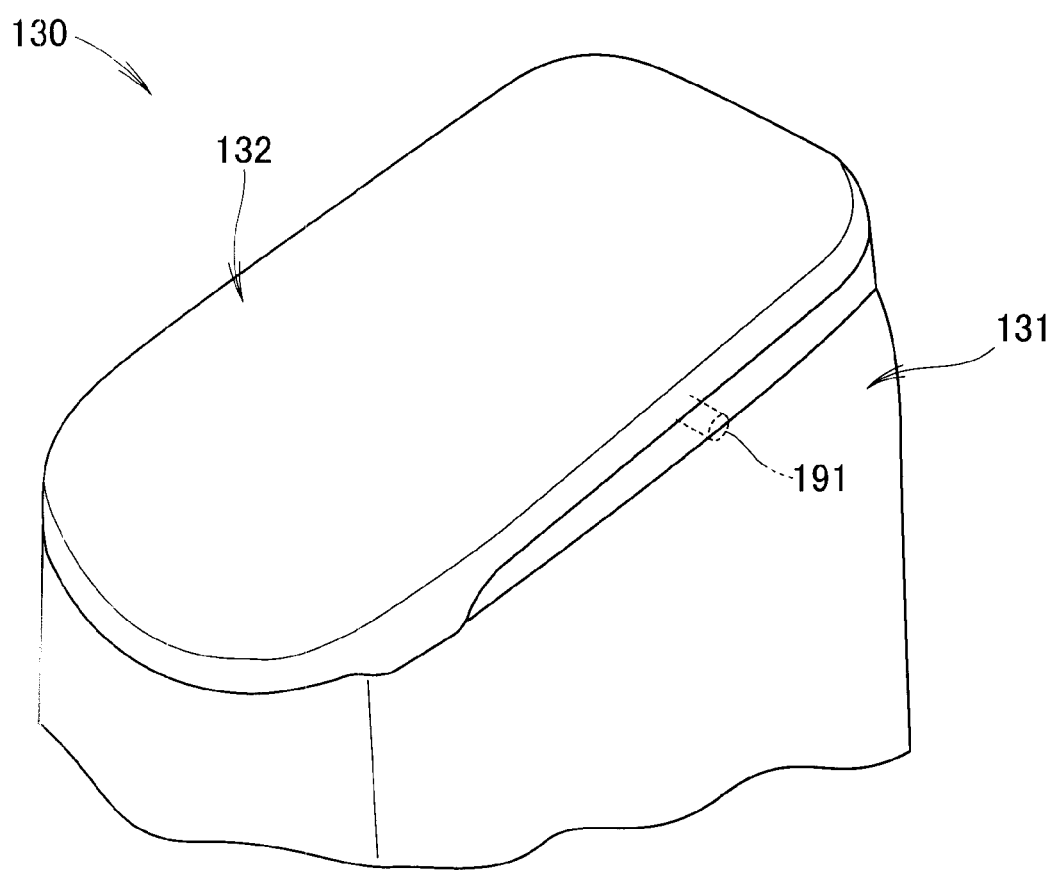
FIG. 14 is a perspective view of the console box of FIG. 11 with the lid portion in the closed position.

The lid portion 132 improves aesthetic aspect of the console box 130 by covering the projections 191, 191, as shown in FIG. 14.

The projections 91, 91, which have been described as being integral with the outer member 81, may be provided separately from the outer member 81. The projection 91 may be provided only one of on the side surfaces 33a, 33a of the storage portion 33.

The shield wall 46, which has been described as being separate from the inner lid member 42, may be formed integrally with the inner lid member 42.

The urging member 34, which has been described as being provided on the left side of the lid portion 32, may be provided on the right side or both left and right sides of the lid portion 32.

The storage portion 33, which has been described as including the outer member 81, the inner member 82 and the cover member 83, may omit the inner member 82.

The support shafts 54, 54 and the support shafts 84, 84, which have boss-shapes, may have other shapes.

The storage portion 33, which has been described as being formed on the lid portion 32 of the console box defined by the center console, may be formed on the glove box 16 shown in FIG. 1.

The rails 135 may be modified to extend laterally inwardly of the console box 131 to stop the storage portion 133 as the storage portion 133 is in the closed position. Alternatively, the storage portion 133 (outer member 181) may have a hook adapted to abut on the modified rails 135 such that the rails 135 stop the storage portion 133 as the storage portion 133 is in the closed position. The modified rails 135 enables use of the console box with the partition member 137 removed from the rails 135.

The console box according to the present invention is suitable for use in a car such as a sedan or a van.

Obviously, various minor changes and modifications of the present invention are possible in light of the above teaching. It is therefore to be understood that within the scope of the appended claims the invention may be practiced otherwise than as specifically described.

What is claimed is:

1. A console box placed in a passenger compartment of a vehicle, the console box comprising:
    a console body for storing a first article;
    a lid portion located on a top surface of the console body and movable between an open position and a closed position relative to the console body; and
    a storage portion formed on a back surface of the lid portion for storing a second article,
    wherein the storage portion is configured to move to an open position relative to the lid portion, keeping a predetermined angle relative to the lid portion, when the lid portion is moved to the open position relative to the console body, and to move to a closed position relative to the lid portion in response to movement of the lid portion to the closed position relative to the console body.

2. The console box of claim 1, wherein the lid portion includes one end and a support shaft, the one end of the lid portion being attached to the console body through the support shaft of the lid portion in such a manner as to allow the lid portion to pivot between the open position and the closed position relative to the console body, wherein the storage portion includes one end and a support shaft, the one end of the storage portion being attached to the lid portion through the support shaft of the storage portion in such a manner as to allow the storage portion to pivot between the open position and the closed position relative to the lid portion, and wherein the lid portion includes a free end opposite the one end of the lid portion and the storage portion includes a free end opposite the one end of the storage portion, the free end of the lid portion and the free end of the storage portion facing in the same direction.

3. The console box of claim 2, wherein the free end of the storage portion moves away from the free end of the lid portion during pivotal movement of the lid portion to the open position relative to the console body.

4. The console box of claim 1, further comprising an urging member disposed between the lid portion and the storage portion and urging the storage portion in such a direction as to allow the storage portion to move to the open position relative to the lid portion.

5. The console box of claim 1, wherein the storage portion includes a lateral side surface and a projection projecting from the lateral side surface, the projection abutting on the console body when the lid portion is moved to the closed position relative to the console body.

6. The console box of claim 2, wherein the storage portion defines an opening proximate the support shaft of the storage portion such that a third article smaller in size than the second article is removed from the opening.

7. The console box of claim 2, wherein the lid portion includes a shield wall disposed on the back surface of the lid portion, the shield wall being located proximate the free end of the storage portion with the lid portion in the closed position relative to the console body so as to prevent the second article from coming out of the storage portion.

8. The console box of claim 5, wherein the lid portion includes a guide hole for guiding the projection.

9. The console box of claim 1, wherein the storage portion includes a lateral side surface and a projection projecting from the lateral side surface, and the lid portion includes a guide hole for guiding the projection.

10. The console box of claim 9, wherein, when the lid portion is moved to the closed position relative to the console body, the storage portion is moved to the closed position relative to the lid portion, where the storage portion abuts on the console body.

11. The console box of claim 10, wherein the projection projects further outwardly than the guide hole and comes into abutment on an upper surface of the console body when the storage portion is moved to the closed position relative to the lid portion in unison with the movement of the lid portion to the closed position relative to the console body.

* * * * *